US012594797B2

(12) United States Patent
Corghi

(10) Patent No.: US 12,594,797 B2
(45) Date of Patent: Apr. 7, 2026

(54) MACHINE FOR MOUNTING AND DEMOUNTING A TYRE RELATIVE TO A CORRESPONDING VEHICLE WHEEL RIM AND METHOD FOR MOUNTING A TYRE

(71) Applicant: NEXION S.p.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 438 days.

(21) Appl. No.: 18/047,702

(22) Filed: Oct. 19, 2022

(65) Prior Publication Data

US 2023/0118720 A1 Apr. 20, 2023

(30) Foreign Application Priority Data

Oct. 20, 2021 (IT) ......................... 102021000026960

(51) Int. Cl.
B60C 25/138 (2006.01)
B60C 25/05 (2006.01)
(52) U.S. Cl.
CPC ........ B60C 25/138 (2013.01); B60C 25/0566 (2013.01); B60C 25/0593 (2013.01)
(58) Field of Classification Search
CPC .............. B60C 25/138; B60C 25/0566; B60C 25/0593; B60C 25/0527; B60C 25/059;
(Continued)

(56) References Cited

U.S. PATENT DOCUMENTS 5,307,854 A * 5/1994 Brewer ................... B24B 5/366
157/13

6,182,736 B1 * 2/2001 Cunningham ........ B60C 25/135
157/1.24
(Continued)

FOREIGN PATENT DOCUMENTS

CN 105109288 A 12/2015
CN 106183665 B 4/2019
(Continued)

OTHER PUBLICATIONS

Italian Search Report dated Jun. 7, 2022 for corresponding Italian Application No. IT202100026960.

*Primary Examiner* — David B. Thomas
(74) *Attorney, Agent, or Firm* — Chrisman Gallo Tochtrop LLC

(57) ABSTRACT

A machine (M) for mounting and demounting a tyre (P) relative to a corresponding rim (C) of a vehicle wheel (R) comprises a wheel-holder unit (200) that is movable in rotation about a vertical axis of rotation (Y) and movable in translation along an axis of translation (X) towards and away from the machine (M). The machine (M) comprises a main arm (400) and a working unit (500) connected to the main arm (400) and including a first arm (501a) pivoted to the main arm (400) at a hinge point (F) and a first sidewall pressing tool (502a) which is configured to come into abutment against a sidewall of the tyre (P) of the wheel (R) mounted on the wheel-holder unit (200) and which is connected to the first arm (501a). The main arm (400) is movable by translation parallel to the horizontal axis of translation (X) towards and away from a column (101) to keep the hinge point (F) vertically aligned with the vertical axis of rotation (Y) of the wheel-holder unit (200), responsive to a movement in translation of the wheel-holder unit (200).

20 Claims, 6 Drawing Sheets

(58) Field of Classification Search
    CPC . B60C 25/0521; B60C 25/132; B60C 25/135;
                                        B60C 25/0548
    See application file for complete search history.

(56)                    References Cited

U.S. PATENT DOCUMENTS

| | | | | |
|---|---|---|---|---|
| 7,438,109 | B2 * | 10/2008 | Cunningham | ........ B60C 25/138 |
| | | | | 157/1.24 |
| 8,387,675 | B1 * | 3/2013 | Vaninger | ............... B60C 25/059 |
| | | | | 157/1.24 |
| 2009/0236047 | A1 * | 9/2009 | Mimura | ............... B60C 25/138 |
| | | | | 157/1.17 |
| 2013/0042980 | A1 * | 2/2013 | Sotgiu | ................... B60C 25/138 |
| | | | | 73/146 |

FOREIGN PATENT DOCUMENTS

| | | |
|---|---|---|
| EP | 1 897 710 B1 | 3/2009 |
| EP | 2 103 457 A1 | 9/2009 |
| EP | 2 962 876 A1 | 1/2016 |
| EP | 3 659 832 A1 | 6/2020 |
| JP | 2002-103933 A | 4/2002 |

* cited by examiner

MACHINE FOR MOUNTING AND DEMOUNTING A TYRE RELATIVE TO A CORRESPONDING VEHICLE WHEEL RIM AND METHOD FOR MOUNTING A TYRE

This invention relates to a machine for mounting and demounting a tyre relative to a corresponding vehicle wheel rim.

The invention also relates to a method for mounting a vehicle wheel tyre relative to a corresponding wheel rim.

As is known, a machine for mounting and demounting a tyre comprises a frame that generally includes a column that extends vertically and a base that is placed on the floor. On this base, the machine comprises a locking system configured to lock the wheel rim so it can be set in rotation about a vertical axis during operations for mounting the respective tyre to the rim.

The machine also comprises an operating unit that includes working tools, such as mounting tools which can be activated during operations for mounting the tyre to the rim, and, possibly, demounting tools which can be activated during operations for demounting the tyre from the rim.

To facilitate mounting operations, the machine normally comprises an articulated arm connected to the column of the frame and extending above the locking system. Such an articulated arm generally has connected to it a sidewall pressing tool (such as, for example, a roller or a contoured element) configured, during the mounting operation, to press against the sidewall of the tyre so as to push the tyre downwards and force its bead to remain within the annular groove of the rim after the bead has been inserted into the rim by the mounting tool. Known in the prior art are machines in which the articulated arm is movable slidably along the column between a lowered position in which it moves the sidewall pressing tool close to the tyre, and a raised position in which it moves the sidewall pressing tool away from the tyre.

An example of an articulated arm is also shown in EP1897710B1. In that document, the articulated arm comprises a first portion having a first end which is hinged to the column and a second end to which a second portion is operatively associated at a hinge point. At a free end of it, the second portion has a sidewall pressing tool.

In use, as described in EP1897710B1, the articulated arm is activated at the time of mounting the tyre to the wheel rim. In this situation, the first portion rotates about the first end to bring the hinge point to a position where it is vertically aligned with the centre of the wheel below. Next, the articulated arm is moved to the lowered position so as to bring the sidewall pressing tool into contact with the side-wall of the tyre. In this situation, to keep the tyre bead inside the annular groove of the rim, the rim is set in rotation by the wheel-holder unit. By so doing, the sidewall pressing tool, which is engaged against the sidewall, moves with the tyre and causes the second portion of the articulated arm to rotate about the hinge point. In this situation, the sidewall pressing tool applies pressure on the whole of the sidewall of the tyre, thus forcing the bead to remain within the annular groove of the rim.

Also known are solutions in which the articulated arm is fixed to the column, generally in proximity to the end of the column, and an actuator, located at the other end of the arm, moves the sidewall pressing tool towards/away from the wheel.

An example of such an articulated arm is shown in EP3659832A1, where the articulated arm extends in a horizontal plane above a wheel-holder unit. This articulated arm has a first end which is hinged to the machine at a hinge point at a fixed position along a vertical direction, and a second end to which an actuator configured to move two sidewall pressing tools vertically towards and away from the wheel is operatively connected. In this situation, when the tyre needs to be mounted to the rim, the articulated arm is moved in the horizontal plane in rotation about the hinge point so as to bring the actuator into vertical alignment with the centre of the rim below. Next, the actuator is activated to move the sidewall pressing tools towards the tyre. In this situation, the sidewall pressing tools engage against the sidewall of the tyre and impart a flattening pressure thereon. Once the sidewall pressing tools are in position, the wheel is set in rotation by the wheel-holder unit and the sidewall pressing tools rotate as one with it while continuing to apply the flattening pressure on the tyre to keep the whole of the tyre bead inside the annular groove of the rim.

Disadvantageously, the prior art machines have several disadvantages connected with the operation and structure of the articulated arm.

In effect, prior art articulated arms are not very versatile in that they are unable to position themselves satisfactorily relative to the axis of the wheel. Another disadvantage is that the articulated arms are not very robust or reliable and after prolonged use, for example, mechanical slack may become excessive.

Another disadvantage is that some prior art arms such as, for example, the arm shown in EP3659832A1, are particularly cumbersome and difficult to manage. In particular, when not in use, some prior art arms tend to make it awkward to fix and remove the wheel to and from the machine because they remain dangling directly above the wheel-holder unit.

On the other hand, other prior art arms, when not in use, are too far removed from the wheel-holder unit, making it inconvenient for them to come into operation when needed.

Other examples of tyre fitting machines are provided by the patent documents EP2962876A1, CN106183665B, CN105109288B, EP2103457A1 and JP2002103933A. However, the solutions proposed by these documents also fail to overcome the disadvantages mentioned above. The technical purpose of this invention is to provide a machine for mounting and demounting a tyre relative to a corresponding vehicle wheel rim and a method for mounting a tyre of a vehicle wheel to a corresponding rim of the wheel to overcome the above mentioned disadvantages of the prior art.

The aim of this invention, therefore is to provide a machine for mounting and demounting a tyre relative to a corresponding vehicle wheel rim and which is easy to use and dependable.

Another aim of this invention is to provide a machine for mounting and demounting a tyre relative to a corresponding vehicle wheel rim and which is versatile and precise.

Another aim of this invention is to provide a machine for mounting and demounting a tyre relative to a corresponding vehicle wheel rim and which does not need to be checked while the tyre is being mounted.

Another aim of this invention is to provide a method for mounting a vehicle wheel tyre relative to a corresponding wheel rim and which is simple and dependable.

The technical purpose and the aims specified are achieved by a machine for mounting and demounting a tyre relative to a corresponding vehicle wheel rim and a method for mounting a tyre of a vehicle wheel to a corresponding rim of the wheel comprising the technical features set out in one or more of the appended claims. The dependent claims correspond to possible embodiments of the invention.

In particular, this invention has for an object a machine for mounting and demounting a tyre relative to a corresponding rim of a vehicle wheel.

The machine comprises a frame provided with a column extending along a vertical direction.

The machine also comprises a wheel-holder unit on which the wheel is placed when the tyre needs to be mounted/demounted to/from the rim. On the wheel-holder unit, the wheel is disposed horizontally (that is to say, with its axis disposed in a vertical direction) so that one sidewall of the wheel faces towards the wheel-holder unit while the other sidewall faces the opposite side. In this situation, the tyre bead and the annular edge of the rim facing the wheel-holder unit are hereinafter called "lower bead" and "lower annular edge" and the tyre bead and the annular edge of the rim facing the opposite side are hereinafter called "upper bead" and "upper annular edge".

The wheel-holder unit is movable in rotation about a vertical axis of rotation and is also movable in translation towards and away from the column along a horizontal axis of translation.

In an embodiment, the wheel-holder unit comprises a clamping chuck, configured to hold the rim in place while the tyre is being mounted.

The machine also comprises a mounting tool, configured to operatively engage the tyre.

More specifically, the mounting tool is configured to be inserted between an upper bead of the tyre and an upper annular edge of the rim while the tyre is being mounted to the rim.

According to an aspect of this disclosure, the machine may also demount the tyre from the rim. In this situation, the machine also comprises a demounting tool, configured to operatively engage the tyre in order to demount the tyre from the rim. More specifically, the demounting tool is configured to be inserted between the upper bead of the tyre and an upper annular edge of the rim while the tyre is being demounted (that is, removed) from the rim.

In an embodiment, the mounting tool and the demounting tool are one and the same, that is to say, the machine comprises a single tool that is capable of mounting the tyre as well as demounting it from the rim.

In the preferred embodiment, however, the mounting tool and the demounting tool are distinct parts.

According to an aspect of this disclosure, the mounting tool is operatively connected to a supporting arm connected to the column.

According to an aspect of this disclosure, the demounting tool is also operatively connected to a supporting arm connected to the column.

In a possible embodiment, the mounting tool and the demounting tool are connected to distinct supporting arms which are movable independently of each other to be activable during mounting and demounting operations, respectively.

Alternatively, the mounting tool and the demounting tool are connected to the same supporting arm. This supporting arm may be rotatable about its own axis of extension so that the wheel is confronted by the mounting tool and the demounting tool alternately. Alternatively, to make the mounting tool and the demounting tool confront the wheel alternately, the demounting tool may be connected to the supporting arm in such a way as to be tiltable between a lowered position, where it is substantially superposed on the mounting tool to operate on the wheel, and a raised position where it is above the mounting tool so that the latter can operate on the wheel.

In an embodiment, to perform the operations needed to demount the tyre from the rim, the machine might also comprise at least one bead breaker disc, operatively connected to the working head and configured to initially detach the upper bead of the tyre from the upper annular edge of the rim.

In the preferred embodiment, the machine comprises two bead breaker discs, positioned above and below the wheel, respectively. The bead breaker discs are movable along the column towards and away from each other so as to operate on the wheel to initially detach the tyre beads from the corresponding annular edges of the rim.

The machine also comprises a main arm, extending above the wheel-holder unit between a first end that is operatively connected to the column, and a second end.

According to an aspect of this disclosure, the main arm extends predominantly in a horizontal plane parallel to the plane defined by the wheel mounted on the wheel-holder unit.

In a possible embodiment, the main arm comprises a first segment, extending from the first end of the main arm, and a second segment, extending from the second end of the main arm and connected to the first segment by a joint such as, for example, a hinge or a pin. This joint is configured to allow adjusting the angular position of the second segment relative to the first segment.

The machine also comprises a working unit connected to the main arm. The working unit includes a first arm pivoted at a hinge point to the second end of the main arm to rotate about the hinge point. More in detail, the hinge point lies in a plane that includes the vertical axis of rotation and the horizontal axis of translation of the wheel-holder unit.

The working unit also comprises a first sidewall pressing tool connected to the first arm and configured to come into abutment against a sidewall of the tyre to be mounted to the rim that is fixed to the wheel-holder unit.

According to an aspect of the disclosure, the sidewall pressing tool, when in abutment against the sidewall of the tyre, is configured to keep the upper bead within the annular groove of the rim, as described in detail below.

According to an aspect of this disclosure, the first sidewall pressing tool is made in the form of a roller that rotates freely about a horizontal axis.

Alternatively, the first sidewall pressing tool is made in the form of a tool with a flat contact surface suitable for coming into abutment against the sidewall of the tyre.

Furthermore, the working unit is also movable along the vertical direction between a working configuration and a rest configuration.

In the working configuration, the working unit is close to the wheel.

More in detail, in the working configuration, the first sidewall pressing tool is abutted against the sidewall of the tyre to apply a flattening pressure thereon so as to keep the upper bead within the annular groove of the rim.

In the rest configuration, on the other hand, the working unit is raised and distal from the wheel-holder unit.

In a possible embodiment, the working unit passes from the working configuration to the rest configuration and vice versa along the vertical direction, thanks to a movement of the entire main arm.

More specifically, the main arm is movable vertically to move the working unit between the working configuration and the rest configuration. In this situation, the working unit is integral with the second end of the main arm and is thus movable as one therewith towards and away from the wheel.

According to an aspect of the disclosure, the main arm is moved vertically by a slide that is slidably driven, for example, by a pneumatic actuator, along a slideway made in the column of the machine. In this situation, the main arm is operatively connected, by its first end, to the slide and is thus movable vertically as one therewith towards and away from the wheel to carry the working unit from the working configuration to the rest configuration and vice versa.

Alternatively, the working unit passes from the working configuration to the rest configuration and vice versa along the vertical direction, thanks to a vertical movement of the working unit itself.

In this situation, the main arm is operatively connected, by its first end, to the column at a fixed vertical height, while the working unit is connected to the second end of the main arm by an actuating member configured to move the working unit vertically between the working configuration and the rest configuration.

In other words, in this embodiment the main arm is operatively connected to the column at a fixed position along the column itself while the working unit is moved by the actuating member towards and away from the second end of the main arm between the working configuration and the rest configuration. In this situation, the main arm does not change its vertical height relative to the wheel-holder unit but it is the working unit that moves towards and away from the wheel-holder unit.

According to an aspect of this disclosure, the main arm is movable by translation along a movement axis parallel to the horizontal axis of translation towards and away from the column to keep the hinge point vertically aligned with the vertical axis of rotation of the wheel-holder unit, responsive to a movement in translation of the wheel-holder unit.

In other words, following a translational movement of the wheel-holder unit, the main arm is made to move in translation parallel to the horizontal axis of translation of the wheel-holder unit so that the vertical axis of rotation of the wheel-holder unit remains vertically aligned with the hinge point.

In a preferred embodiment, the main arm is movable continuously in translation.

The translational movement of the main arm allows the working unit to move the position occupied by the vertical axis of rotation of the wheel-holder unit so that the first sidewall pressing tool can operate correctly on the sidewall of the tyre, as described in detail below. In an embodiment, the movement of the working unit allows the pivot to follow the vertical axis of rotation of the wheel-holder unit.

In a possible embodiment, the main arm is movable in translation thanks to the first segment moving in and out of the column (or, if present, in and out of a suitable housing formed in the slide). In this situation, the first segment of the main arm is parallel to the horizontal axis of translation of the wheel-holder unit so that it can be conveniently extracted from or retracted into the column (or the housing).

In use, the main arm is made to move in translation along the movement axis to a position such as to maintain the vertical alignment between the axis of rotation of the wheel-holder unit and the hinge point.

Next, the working unit is brought to the working configuration so that the first sidewall pressing tool comes into abutment against the sidewall of the tyre and applies a flattening pressure thereon.

Next the wheel-holder unit is set in rotation. In this situation, since the first sidewall pressing tool is engaged on the tyre, it rotates as one with the tyre and remains engaged on the tyre during the whole time the tyre is being mounted to the rim. In particular, after the first sidewall pressing tool has been placed in abutment against the tyre, the wheel entrains the first sidewall pressing tool in rotation with it as soon as the wheel-holder unit starts rotating. In this situation, the first arm (which the first sidewall pressing tool is mounted on) rotates about the hinge point, allowing the first sidewall pressing tool to rotate as one with the tyre and preventing unwanted scraping of the first sidewall pressing tool on the tyre itself.

In other words, to mount the tyre to the rim, the main arm is moved in translation along the movement axis so as to place the hinge point at a position where it is vertically aligned with the axis of rotation of the wheel-holder unit. After that, the working unit moves into the working configuration. In this situation, the wheel-holder unit is set in rotation, thereby causing the first arm (hence also the first sidewall pressing tool) to rotate about the hinge point. More specifically, the first arm is entrained in rotation about the hinge point by the first sidewall pressing tool being held down on the tyre which is rotating on the wheel-holder unit. In this situation, the first arm performs a compass-like movement about the hinge point to allow the first sidewall pressing tool to keep the upper bead inside the annular groove of the rim.

According to an aspect of the disclosure, the working unit may be raised or lowered slightly along the vertical direction while keeping the first sidewall pressing tool engaged on the tyre during mounting of the tyre to the rim. This aspect is particularly advantageous in that it allows precisely adjusting the vertical position of the sidewall pressing tool and preventing stretching and excessive flattening of the tyre.

The aforesaid up or down movement of the working unit may be carried out in the same way as described for the movement between the working configuration and the rest configuration, that is to say, by vertically moving only the working unit by means of an actuating member or by vertically moving the entire main arm along the column.

When mounting is over, the working unit returns to the rest configuration so as not to interfere with operations to remove the wheel from the wheel-holder unit.

In a possible embodiment, to prevent the first sidewall pressing tool from being struck, and possibly damaged, by the wheel during these operations the first arm is tiltable in a vertical plane between a lowered position, where it keeps the first sidewall pressing tool facing the wheel, and a raised position, where the first sidewall pressing tool is tilted away from the wheel. By so doing, when the tyred wheel is removed from (or the bare, untyred rim installed on) the wheel-holder unit, the first sidewall pressing tool does not interfere with the work being done.

In a possible embodiment, the working unit also comprises a second arm, provided with a second sidewall pressing tool that is connected at an angularly fixed position to the second end of the main arm at the hinge point. In other words, the second arm is unable to rotate about the hinge point.

According to an aspect of the disclosure, the second arm, too, is tiltable in a vertical plane between a lowered position, where it keeps the second sidewall pressing tool facing the wheel, and a raised position, where the second sidewall pressing tool is tilted away from the wheel.

Use of the second sidewall pressing tool is particularly advantageous when a tyre of a particularly large wheel needs to be mounted. In this situation, in use, when the working unit is brought from the rest configuration to the working configuration, the second sidewall pressing tool is also moved into abutment against the sidewall of the tyre to force the bead into the rim. When the wheel-holder unit is set in rotation, the second arm, which is fixed at the hinge point, remains fixed (that is to say, it does not change its angular position), whilst the first arm is entrained in rotation about the hinge point by the rotation of the tyre. In this situation, the first arm stops rotating about the hinge point just before the second arm, thus ending its action on the upper bead of the tyre.

Preferably, the second sidewall pressing tool is made in the form of a freely rotating roller so that when it is engaged on the tyre, it can rotate without scraping the tyre.

Alternatively, the second sidewall pressing tool may be made in the form of a disc or other pressing device suitable for abutting against the sidewall of the tyre.

In other words, while the second sidewall pressing tool keeps its angular position relative to the hinge point unchanged, the first sidewall pressing tool rotates about the hinge point until it reaches a position in the proximity of the second sidewall pressing tool.

In a possible embodiment, after it stops rotating about the hinge point, the first arm and the slider mounted on it can be lifted by a cam mechanism such as the one shown in EP1897710B1, which raises it relative to the tyre. According to this disclosure, the first and/or the second sidewall pressing tool may be engaged to the respective arms by means of a slider which can run along the arms to adjust the position of the sidewall pressing tools. This aspect is particularly advantageous in that it allows the position of the first and/or the second sidewall pressing tool to be adjusted according to the diameter of the wheel whose tyre needs to be mounted.

According to an aspect of this disclosure, the sliders are each provided with a fastening wing nut operable manually by an operator and configured to lock the sliders at predetermined positions along the respective arms.

The machine according to this disclosure also comprises a control console. According to an aspect of the disclosure, the control console comprises a display configured to show information relating to the tyre mounting process (and, when necessary, the demounting process), and a control desk comprising a plurality buttons and/or levers configured to allow manually controlling the main arm and/or manually controlling the mounting tool (and, if present, the demounting tool and/or the bead breaker disc).

The control console also comprises a supporting structure extending between the display and the control desk. The supporting structure comprises a vertical central member and a plurality of auxiliary members extending away from the central member in a horizontal direction and provided with compartments to accommodate tools and/or related instruments such as pressure gauges and the like.

In an embodiment, the control console is configured to receive input data representing the diameter size of a wheel mounted on the wheel-holder unit and to send this data to a control unit. The control unit is configured to receive the input data from the control console and, based on this data, to send instructions to the main arm as to how the main arm must be positioned relative to the wheel-holder unit.

In an embodiment, the control unit can also control the horizontal translational movement of the wheel-holder unit.

Furthermore, the control unit may also control the movements of other machine components to perform the mounting and demounting operations. In a possible embodiment, the control unit is also able to control the sliding movements of the sidewall pressing tools along the respective arms based on the diameter of the wheel whose tyre needs to be mounted.

Advantageously, operator intervention on the machine is extremely limited and thus the process of moving the components for mounting the tyre on the wheel is faster and more efficient.

According to an aspect of the disclosure, the main arm, which is provided with the working unit, may be retrofitted on a machine suitable for mounting a tyre to a rim. In this situation, the arm can be used manually, suitably positioning it relative to the wheel when the tyre has to be mounted, or the instructions can be integrated in the control unit to automate the movements of the main arm.

The machine also comprises a supporting rod having a first end that is operatively connected to the control console and a second end that is hinged to the frame to allow the supporting rod to rotate with the control console.

This aspect is particularly advantageous because it allows orienting the control console according to the operator's position and/or according to the space in which the machine is positioned.

This aspect is also advantageous when the machine has to be packed for transportation purposes. In effect, in this situation, the supporting rod is rotated in such a way that the control console occupies the space between the wheel-holder unit and the column.

The machine also comprises a locking device used to prevent the supporting rod from rotating. More specifically, the locking device is used when the machine is installed and does not need to be transported. In effect, the locking device prevents the supporting rod from rotating about the second end when the machine is in use.

This device does not, however, prevent the control console from moving around the first end of the supporting rod. Looking in more detail, the control console is applied to the first end of the supporting rod by an articulated joint configured to allow the control console to rotate about the articulated joint itself.

More specifically, the articulated joint allows the control console to be rotated even when the supporting rod is locked by the locking device. In this situation, the control console is free to rotate so that it can be suitably oriented according to the operator's needs and/or available space.

Also an object of this invention is a method for mounting a tyre of a vehicle wheel relative to a corresponding wheel rim.

The method comprises a step of preparing a machine for mounting the tyre to the rim. The machine includes a frame provided with a column that extends along a vertical direction and a wheel-holder unit that is movable in rotation about a vertical axis of rotation and in translation towards and away from the column along a horizontal axis of translation. The machine also comprises a mounting tool, configured to operatively engage the tyre. The machine also comprises a main arm, extending above the wheel-holder unit between a first end that is connected to the column, and a second end. The working unit then comprises a working unit that includes a first arm pivoted at a hinge point to the second end of the main arm to rotate about the hinge point, and a first sidewall pressing tool connected to the first arm and configured to come into abutment against a sidewall of the tyre mounted on the wheel-holder unit and connected to the first arm.

The method also comprises a step of locking the rim to the wheel-holder unit and, if necessary, a step of moving the wheel-holder unit in translation along the horizontal axis of translation.

The method then comprises a step of moving the main arm in translation along a movement axis, parallel to the horizontal axis of translation and spaced therefrom, towards or away from the column so that the hinge point remains aligned with the vertical axis of rotation of the wheel-holder unit.

In other words, the main arm is made to move in translation so as to adjust the position of the hinge point relative to the position adopted by the vertical axis of rotation of the wheel-holder unit.

The method also comprises a step of placing the mounting tool between an annular edge of the rim and a bead of the tyre.

In this situation, the main arm is placed in such a way that the hinge point is vertically aligned with the axis of rotation of the wheel-holder unit while the mounting tool is inserted between the annular edge of the rim and the tyre bead.

Next, the method comprises a step of moving the working unit along the vertical direction from a rest configuration, where it is raised and distal from the wheel, to a working configuration, where it is moved close to the wheel to bring the first sidewall pressing tool into abutment against the sidewall of the tyre.

In this situation, the first sidewall pressing tool is pressed against the sidewall of the tyre to force the upper bead into the annular groove of the rim in order to mount the tyre on the wheel.

Further features and advantages of this invention are more apparent in the exemplary, hence non-limiting, description of an embodiment of a machine for mounting a tyre relative to a corresponding vehicle wheel rim and a method for mounting a tyre of a vehicle wheel relative to a corresponding wheel rim.

The description is set out below with reference to the accompanying drawings which are provided solely for purposes of illustration without limiting the scope of the invention and in which.

With reference to the accompanying drawings, the letter M denotes a machine for mounting and demounting a tyre P relative to a corresponding rim C of a vehicle wheel R.

The machine M comprises a frame 100 provided with a column 101 extending along a vertical direction W.

The machine M also comprises a wheel-holder unit 200 on which the wheel R is placed when the tyre P needs to be mounted to the rim C.

According to an aspect of this disclosure, the wheel-holder unit 200 stands opposite the frame 100 on an extension of the frame 100 acting as a base.

Figure 3A:
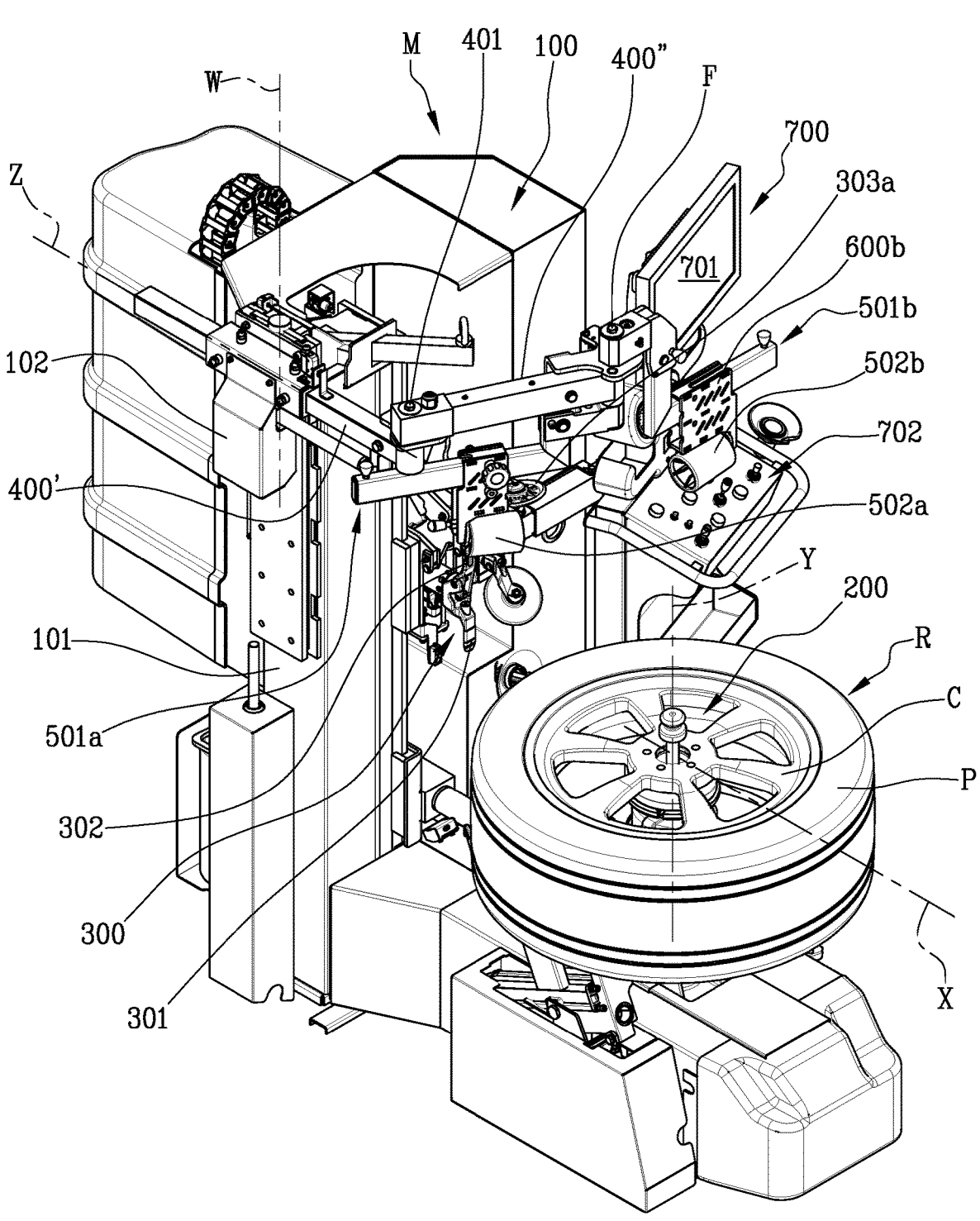
FIGS. 3A and 3B show perspective views of the machine of FIG. 1 in a rest configuration and in a working configuration, respectively.

As shown in FIG. 3A, the wheel R is mounted on the wheel-holder unit 200 in such a way that the axis of rotation of the wheel R is positioned vertically, that is to say, in such a way that the wheel R has one sidewall facing towards the wheel-holder unit 200 (that is, towards the base of the machine M) and one sidewall facing in the opposite direction. In this situation, the bead facing towards the wheel-holder unit 200 may be defined as "lower bead" of the tyre P and the opposite bead as "upper bead". Similarly, the annular edge of the rim C facing towards the wheel-holder unit 200 may be defined as "lower annular edge" and the opposite annular edge as "upper annular edge".

The wheel-holder unit 200 is movable in rotation about a vertical axis of rotation Y and is also movable in translation towards and away from the column 101 along a horizontal axis of translation X.

To facilitate loading and removing the wheel R onto and from the wheel-holder unit 200, the machine M comprises a lifting system 201 located in the proximity of the wheel-holder unit 200. The lifting system 201 comprises a supporting base 202 on which the wheel R can be rested and which is movable between a loading/unloading position, where it is inclined relative to the wheel-holder unit 200 so as to be used to all effects like a ramp on which the wheel R can be rested, and an unloading position, where it is positioned horizontally so that the wheel R resting on it can be pushed towards the wheel-holder unit 200.

The machine M also comprises a mounting tool 301, configured to operatively engage the tyre P.

More specifically, the mounting tool 301 is configured to be inserted between the upper bead of the tyre P and an upper annular edge of the rim C while the tyre P is being mounted to the rim, as described in detail below. In the embodiment shown in the accompanying drawings, the mounting tool 301 is operatively connected to an operating head 300 that is slidably movable along the vertical direction W towards and away from the wheel R. In the embodiment shown in the accompanying drawings, the machine M comprises a supporting arm 800 that is connected to the column 101 which the mounting tool 301 is connected to in order to operatively engage the tyre P so as to mount the tyre to the rim C.

In the preferred embodiment, the supporting arm 800 is movable along a direction parallel to the horizontal axis of translation X between an extracted position, where it places the mounting tool 301 close to the wheel to operate thereon, and a retracted position where it places the mounting tool 301 away from the wheel R.

The machine M also comprises a demounting tool 302, configured to operatively engage the tyre P in order to demount the tyre from the rim C. In the preferred embodiment, the demounting tool 302 is operatively connected to the same supporting arm 800 which the mounting tool 301 is connected to. In this situation, the supporting arm 800 is rotatable about its direction of extension so as to confront the tyre P with the mounting tool 301 and the demounting tool 302 alternately.

As shown in the accompanying drawings, the machine M may also comprise a first and a second bead breaker disc 303a, 303b which are configured to operate on the tyre P when it is being demounted from the rim C. More specifically, the first bead breaker disc 303a separates the upper bead of the tyre P from the upper annular edge of the rim C and the second bead breaker disc 303b separates the lower bead of the tyre P from the lower annular edge of the rim C.

The machine M also comprises a main arm 400, extending above the wheel-holder unit 200 between a first end 400a that is operatively connected to the column 101, and a second end 400b.

Figure 2:
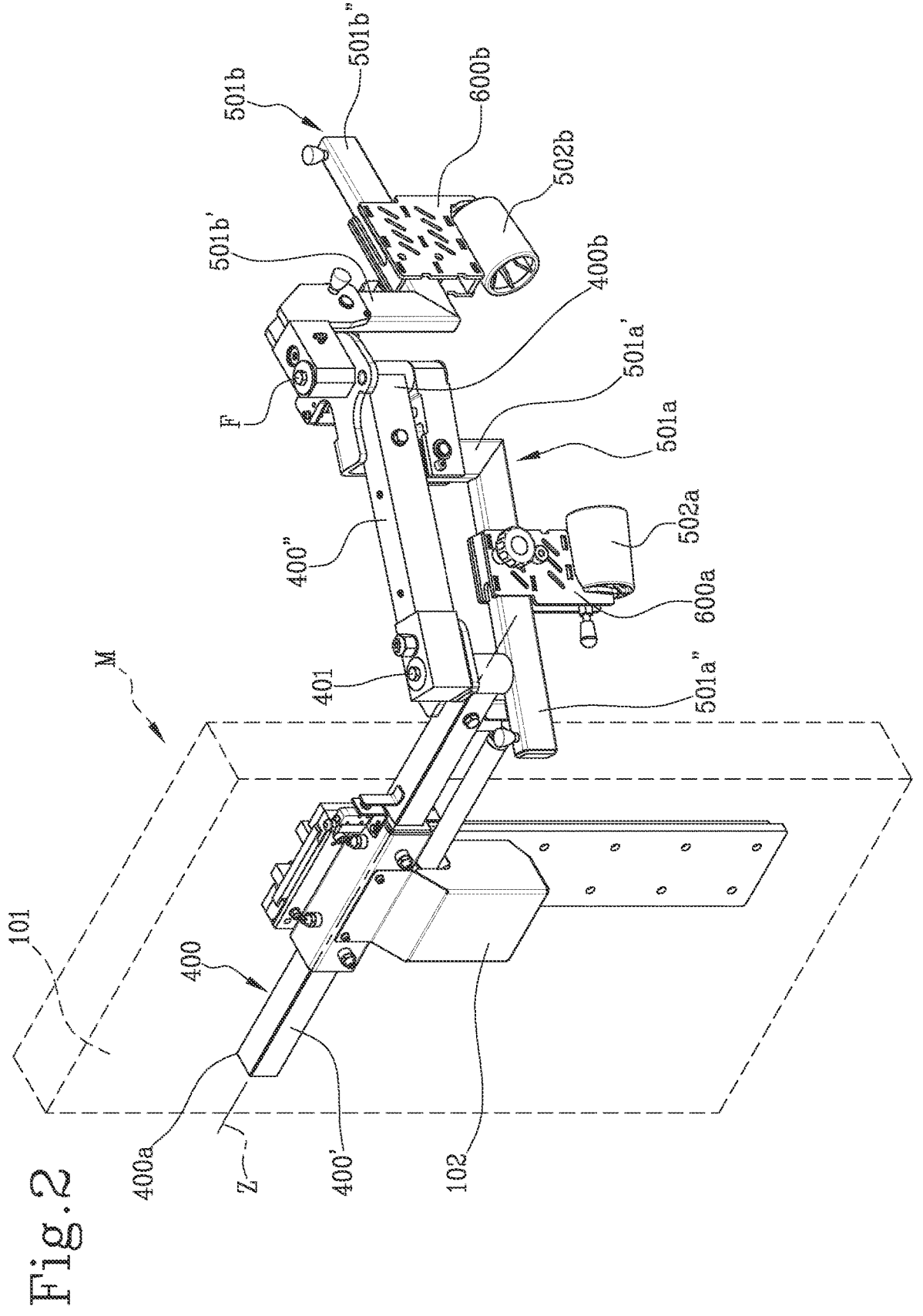
FIG. 2 shows a perspective view of an articulated arm that can be installed on the machine of FIG. 1.

As shown in FIG. 2, the main arm 400 comprises a first segment 400' extending from the first end 400*a* of the main arm 400.

In the embodiment shown in the accompanying drawings, the first segment 400' extends along a direction parallel to the horizontal axis of translation X of the wheel-holder unit 200.

The main arm 400 also comprises a second segment 400" extending from the second end 400*b* of the main arm 400 and connected to the first segment 400' by a joint 401.

The joint 401 is configured to allow adjusting the angular position of the second segment 400" relative to the first segment 400'.

In the embodiment shown in the accompanying drawings, the joint 401 is made in the form of a hinge.

Alternatively, the joint 401 may be made in any form that will allow adjusting the angular position of the second segment 400" relative to the first segment 400'.

According to an aspect of this invention, the joint 401 is operable manually by an operator slackening it to modify the angular position of the second segment 400" and then tightening it to lock the second segment 400" at that position.

Alternatively, the joint 401 is operable automatically by a control unit of the machine M.

Figure 1:
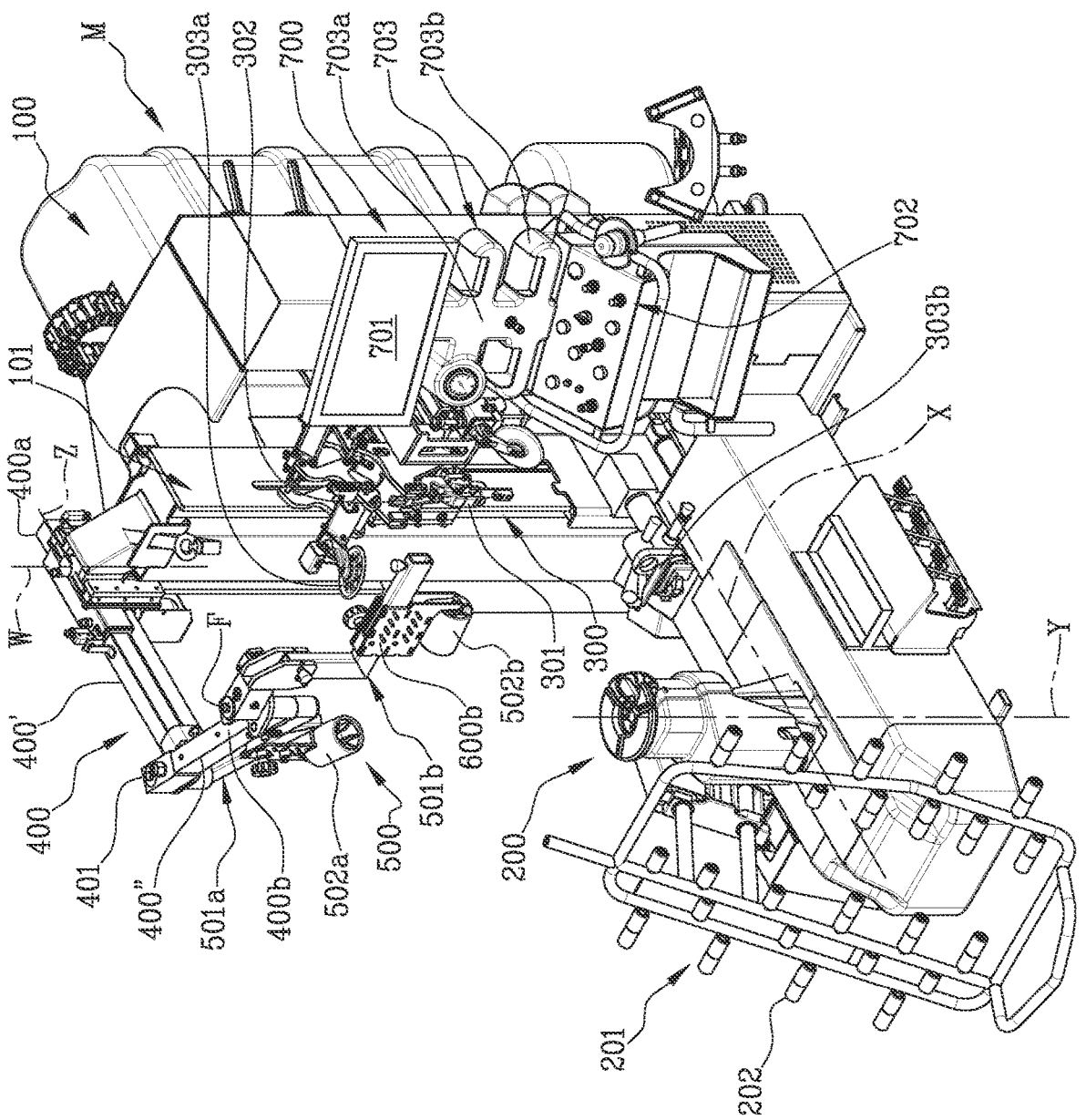
FIG. 1 shows a perspective view of a machine for mounting a tyre to a corresponding wheel rim according to this invention.
Figure 5:
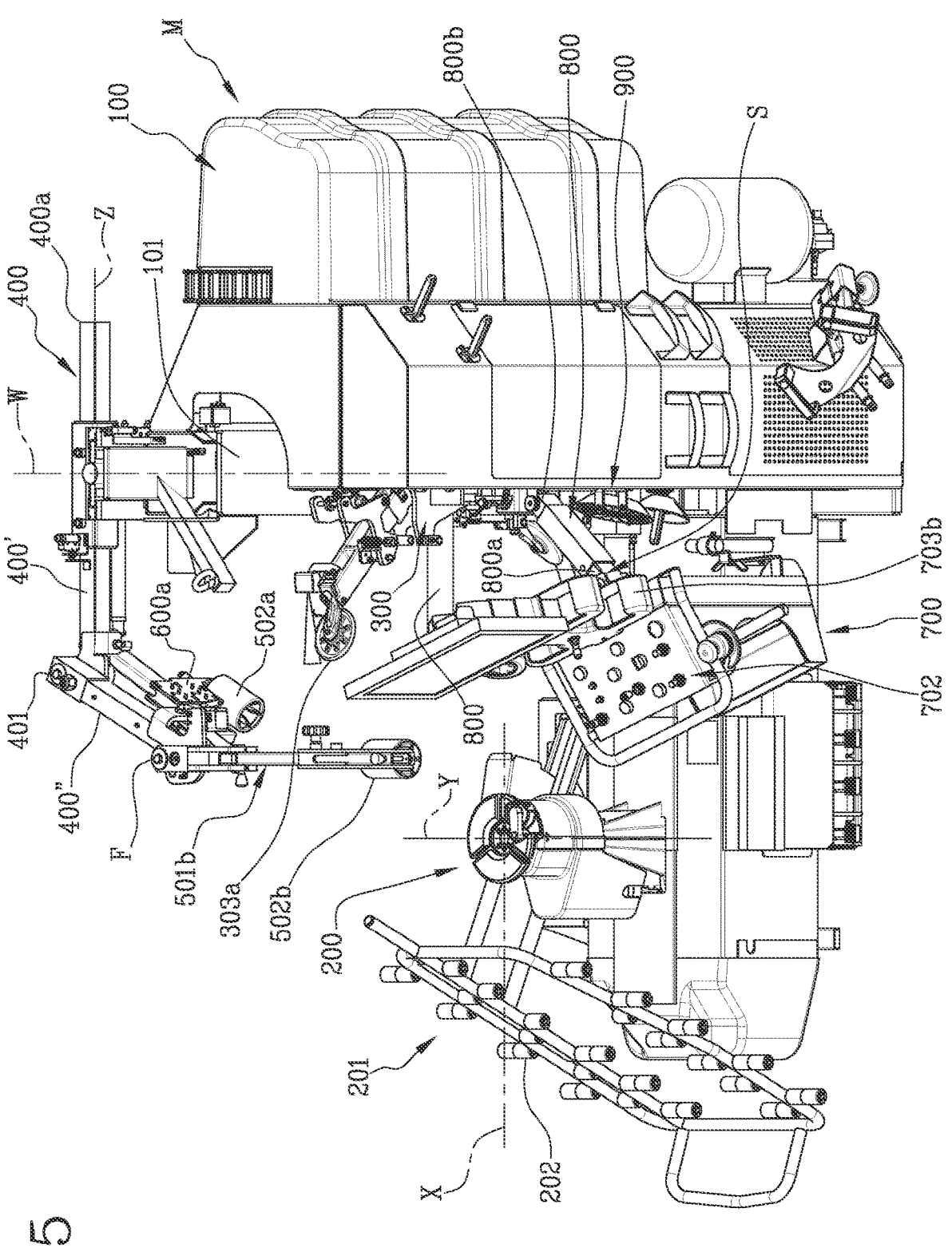
FIG. 5 shows another perspective view of the machine of FIG. 1.

As shown in FIGS. 1 and 2, the machine M also comprises a working unit 500 that is connected to the main arm 400 and includes a first arm 501*a* pivoted at a hinge point F to the second end 400*b* of the main arm 400 to rotate about the hinge point F itself. As shown in FIG. 5, the hinge point F lies in a plane that includes the vertical axis of rotation Y and the horizontal axis of translation X of the wheel-holder unit 200.

The working unit 500 also comprises a first sidewall pressing tool 502*a* connected to the first arm 501*a* and configured to come into abutment against a sidewall of the tyre P of the wheel R mounted on the wheel-holder unit 200.

According to an aspect of this disclosure, the first sidewall pressing tool 502*a* is made in the form of a roller that rotates freely about a horizontal axis.

Alternatively, the first sidewall pressing tool 502*a* may be made in the form of a pressing device.

Figure 3B:
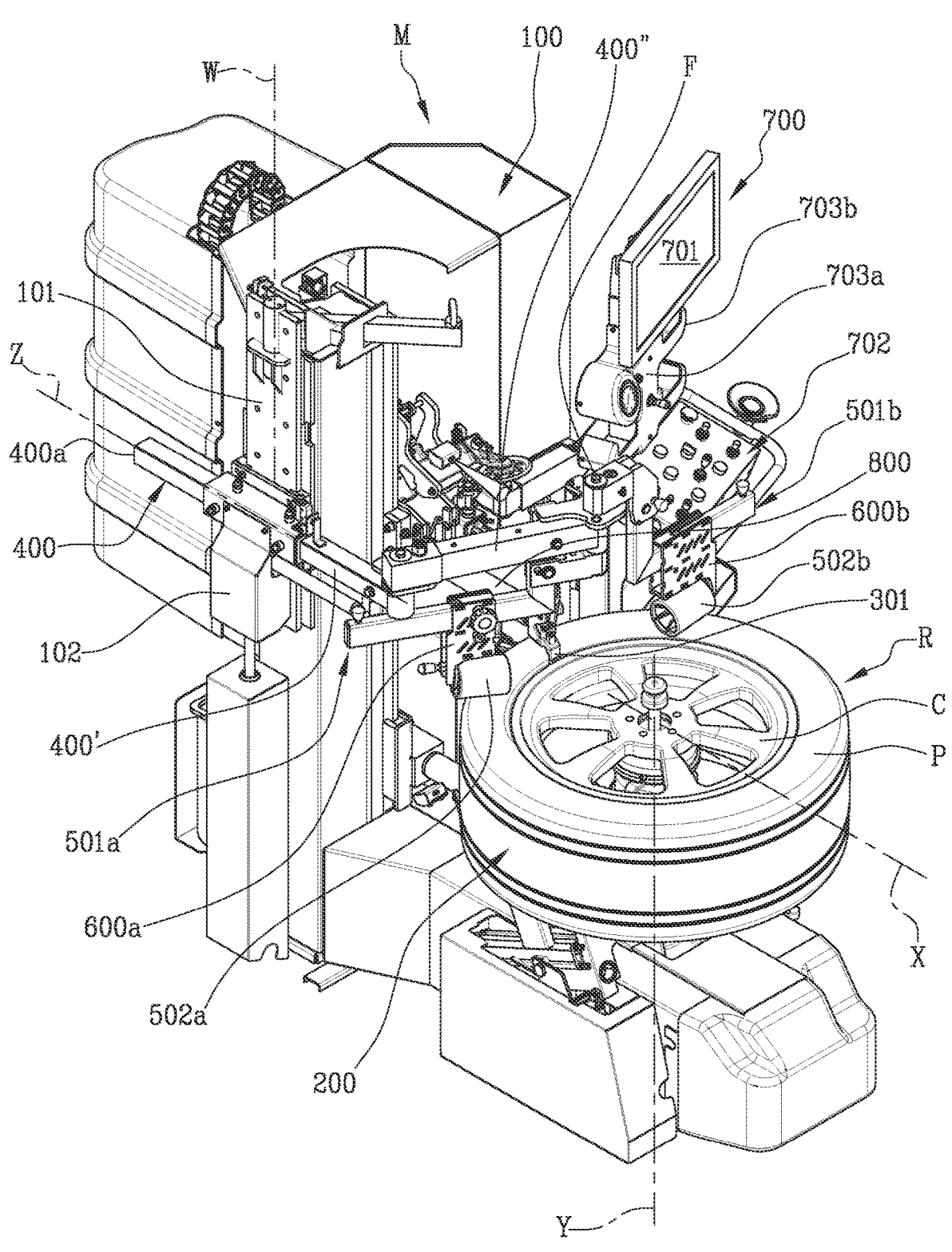

As shown in FIGS. 3A and 3B, the working unit 500 is movable along the vertical direction W between a working configuration, where it is close to the wheel-holder unit 200 and a rest configuration, where it is raised and distal from the wheel-holder unit 200.

More in detail, in the working configuration, the first sidewall pressing tool 502*a* is engaged against the tyre P to keep the upper bead of the tyre P within the annular groove of the rim C, as will be described below.

With reference to the embodiment shown in FIGS. 3A and 3B, the working unit 500 is movable between the rest configuration thanks to a vertical translational movement of the main arm 400. In effect, according to an aspect of this disclosure, the main arm 400 is movable vertically to move the working unit 500 between the working configuration and the rest configuration.

Looking in more detail, as shown in FIGS. 2 and 3A-3B, the main arm 400 is operatively connected to the column 101 by a slide 102 which can be driven by an actuator slidably along the column 101. In this situation, since the working unit 500 is fixed permanently as one to the second end 400*b* of the main arm 400, a sliding movement of the slide 102 corresponds to a vertical translational movement of the main arm 400, hence of the working unit 500, from the working configuration to the rest configuration and vice versa.

In the embodiment shown in the accompanying drawings, the slide 102 is located on a side portion of the column 101 of the machine M so as not to hamper or endanger the operator during mounting operations.

Figure 4:
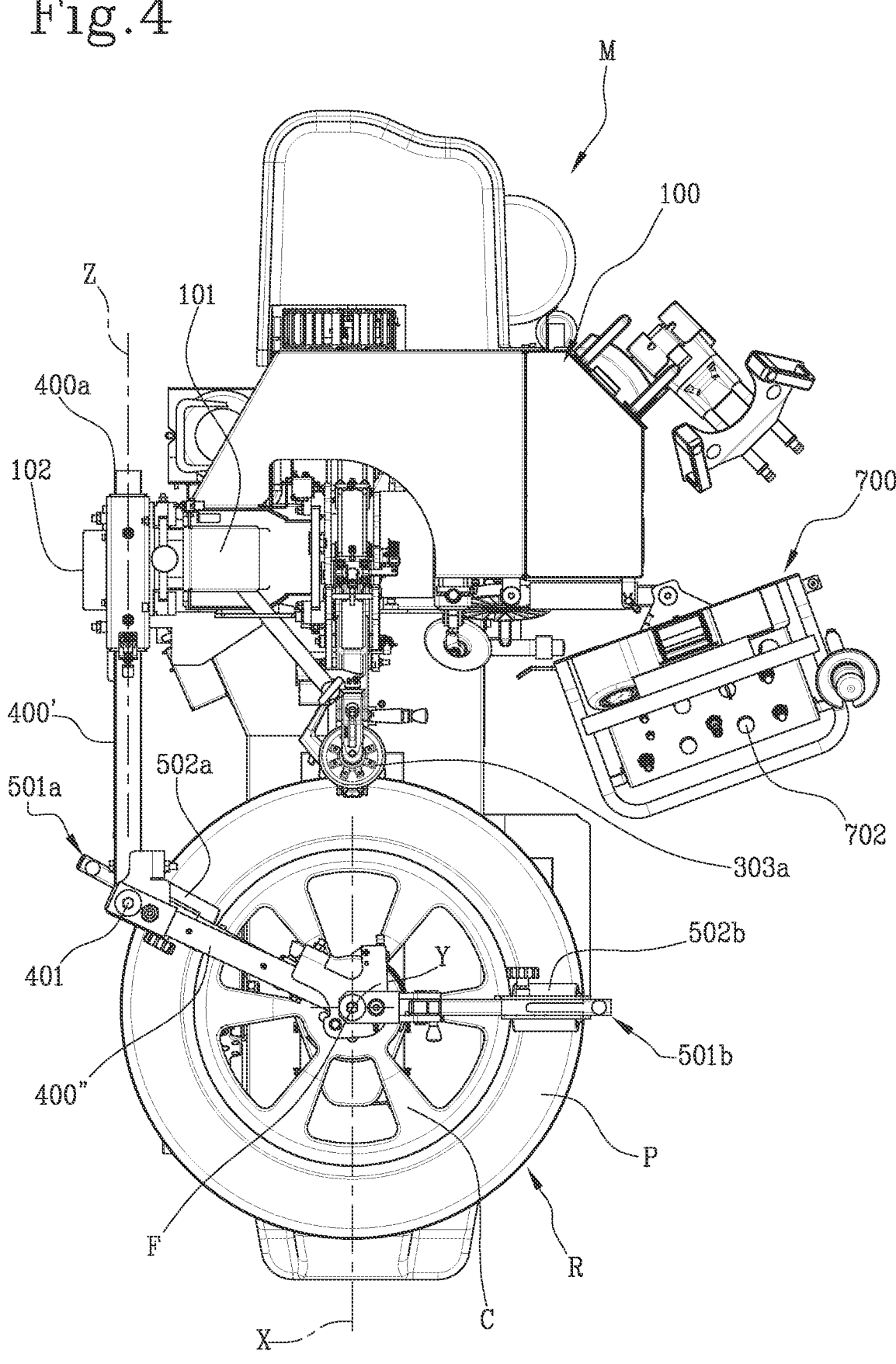
FIG. 4 shows a plan view of the machine of FIG. 1.

According to an aspect of this disclosure, the main arm 400 is movable by translation along a movement axis Z parallel to, and spaced from, the horizontal axis of translation X towards and away from the column 101 to keep the hinge point F vertically aligned with the vertical axis of rotation Y of the wheel-holder unit 200, responsive to a movement in translation of the wheel-holder unit 200 (arrow, FIG. 4).

In use, at the start of mounting operations, the main arm 400 is made to move in translation along the movement axis Z towards and away from the column 101 so as to align the hinge point F vertically with the vertical axis of rotation Y of the wheel-holder unit 200 based on the position adopted by the latter after being moved in translation along the horizontal axis of translation X.

In other words, the main arm 400 is made to move in translation parallel to the horizontal axis of translation X so as to adjust the position F of the hinge point relative to the position adopted by the vertical axis of rotation Y of the wheel-holder unit 200 after the latter has been moved in translation.

In the embodiment shown in the accompanying drawings, to allow the main arm 400 to move in translation, the first segment 400' is housed in a specially shaped housing made in the slide 102 and is moved in and out of the housing by an actuator.

In use, therefore, to mount the tyre P to the rim C, the rim C is fastened to the wheel-holder unit 200 while the tyre P is rested thereon, ready to be fitted into the annular groove of the rim C. After that, the main arm 400 moves in translation towards and away from the column 101 in order to bring the hinge point F into vertical alignment with the vertical axis of rotation Y of the wheel-holder unit 200 (that is to say, with the centre of the rim C). Looking in more detail, the first segment 400" is moved in and out of the housing so as to align the hinge point F with the centre of the rim C below. In this situation, as shown in FIG. 4, the first segment 400 is disposed parallel to the horizontal axis of translation X, while the second segment 400" is inclined at an angle such as to keep the hinge point vertically aligned with the vertical axis of rotation Y of the wheel-holder unit 200.

Next, the mounting tool 301 is inserted between the upper bead of the tyre P and the upper annular edge of the rim C.

In a subsequent step, the main arm 400 is moved down along the column 101 in order to move the working unit 500 from the rest configuration (FIG. 3A) to the working configuration (FIG. 3B). In this situation, the first sidewall pressing tool 502*a* is engaged against the sidewall of the tyre P to press down on the upper bead.

Once the working unit 500 is in the working configuration, the wheel-holder unit 200 is set in rotation.

In this situation, since the first sidewall pressing tool 502*a* is engaged on the sidewall of the tyre P, it is entrained in rotation by the tyre P itself. This causes the first arm 501*a* to move freely in rotation about the hinge point F. That way, the first sidewall pressing tool 502*a* is one with the tyre P and operates thereon to hold down the upper bead.

When mounting is over, that is to say, when the whole of the upper bead has been inserted into the annular groove of the rim C, the main arm 400 is raised, causing the working unit 500 to pass from the working configuration to the rest configuration. In this situation, to prevent the wheel R from striking the first sidewall pressing tool 502a and/or the first arm 501a while the wheel R is being removed from the wheel-holder unit 200, the first arm 501a is also tiltable in a vertical plane between a lowered position, in which it keeps the first sidewall pressing tool 502a at a position where it confronts the wheel R, and a raised position, where it tilts the first sidewall pressing tool 502a away from the wheel R.

Looking in more detail, at its structure, the first arm 501a, as shown in FIG. 2, comprises a first portion 501a' which, in the working configuration, extends parallel to the vertical direction W. The first arm 501a also comprises a second portion 502a'', oriented transversely to the first portion 501a' to define a shape substantially like that of a letter L. In this situation, the first sidewall pressing tool 502a is mounted at a free end of the second portion 501a''.

Again with reference to FIG. 2, the machine M comprises a slider 600a, engaged with the first sidewall pressing tool 502a and movable slidably along the second portion 501a'' of the first arm 501a to adjust the position of the first sidewall pressing tool 502a, for example, according to the diameter of the wheel R.

According to an aspect of this disclosure, the working unit 500 also comprises a second arm 501b, provided with a second sidewall pressing tool 502b that is connected at an angularly fixed position to the second end 400b of the main arm 400 at the hinge point F.

In the embodiment shown in the accompanying drawings, the second arm 501b, too, has a first portion 501b' which runs parallel to the vertical direction W when the working unit 500 is in the working configuration, and a second portion 501b'' which is oriented transversely to the first portion 501b'. In this situation, the second arm 501b has a substantially L-shaped configuration in which the first sidewall pressing tool 502b is mounted at a free end of the second portion 501b''.

Preferably, the second sidewall pressing tool 502b is also made in the form of a freely rotating roller with a substantially horizontal axis.

Alternatively, the second sidewall pressing tool 502b may be made in the form of a disc.

According to an aspect of the disclosure, the machine M comprises a further slider 600b, engaged with the second sidewall pressing tool 502b and movable slidably along the second portion 501b'' of the second arm 501b to adjust the position of the second sidewall pressing tool 502b, for example, according to the diameter of the wheel R.

In the embodiment shown in the accompanying drawings, the first and the second sidewall pressing tools 502a, 502b are mounted on the respective sliders 600a, 600b in such a way that their respective axes of rotation are slightly convergent towards each other and towards the vertical axis of rotation Y of the wheel-holder unit 200. This inclination contributes to and facilitates the action of holding down the upper bead.

According to another aspect of the disclosure, the second arm 501b, too, is tiltable in a vertical plane between a lowered position, where it keeps the second sidewall pressing tool 502b facing the wheel R, and a raised position, where the second sidewall pressing tool 502b is tilted away from the wheel R.

Advantageously, the possibility of tilting the second arm 501b is particularly useful in that it allows using the second sidewall pressing tool 502b when the wheels R being handled are especially large, whilst the second sidewall pressing tool 502b can be placed at a rest position of non-interference when it is not needed, that is to say, when the wheels R involved are smaller and a single sidewall pressing tool is sufficient.

As shown in the accompanying drawings, the first and the second sidewall pressing tools 502a, 502b are positioned at the same vertical height. More in detail, when the first and the second sidewall pressing tools 502a, 502b are both at the lowered position and the working unit 500 is in the working configuration, they are positioned at substantially the same height so that they both act on the sidewall of the tyre P.

In a possible embodiment, the vertical height of the first and second sidewall pressing tools 502a, 502b relative to the respective arms 501a, 501b can be adjusted.

In use, therefore, when the second sidewall pressing tool 502b is not needed, it is moved to the lowered position. Next, the working unit 500 is moved from the rest configuration to the working configuration so that the first and second sidewall pressing tools 502a, 502b are engaged on the sidewall of the tyre P. After that, the wheel-holder unit 200 is set in rotation. In this situation, the second sidewall pressing tool 502b is not entrained in rotation by the tyre P but remains at an angularly fixed position relative to the hinge point F. On the other hand, the first sidewall pressing tool 502a (together with the first arm 501a) is entrained in rotation by the tyre P, which is rotating about the hinge point F. In this situation, the first arm 501a stops rotating about the hinge point F just before the second arm 501b.

According to an aspect of this disclosure, the machine M also comprises a control console 700 for controlling and driving the machine during mounting operations.

According to an aspect of the disclosure, the control console 700 comprises a display 701 configured to show information relating to the process for mounting the tyre P, and a control desk 702 comprising a plurality of buttons and/or levers configured to allow manually controlling the main arm 400.

If necessary, the plurality of buttons and/or levers can be used for manually controlling the tilting of the first and second arms 501a, 501b and/or for manually controlling the mounting tool 301.

The control console 700 also comprises a supporting structure 703 extending between the display 701 and the control desk 702. The supporting structure 703 comprises a vertical central member 703a and a plurality of auxiliary members 703b extending away from the central member 703a in a horizontal direction and provided with tool compartments.

The control console 700 is configured to receive input data representing the diameter size of a wheel R mounted on the wheel-holder unit 200 and to send this data to a control unit. The control unit is configured to receive the input data from the control console 700 and, based on this data, to send instructions to the main arm 400 as to how the main arm 400 must be positioned relative to the wheel-holder unit 200.

In a possible embodiment, the control console 700 is also configured to move the mounting tool and/or other tools of the machine M.

The machine M also comprises a supporting rod 800 having a first end 800a that is operatively connected to the control console 700 and a second end 800b that is hinged to the frame 100 to allow the supporting rod 800 to rotate with the control console 700.

This aspect is particularly advantageous because it allows orienting the control console 700 according to the operator's position and/or according to the space in which the machine M is positioned.

This aspect is also advantageous when the machine M has to be packed for transportation purposes. In effect, in this situation, the supporting rod 800 is rotated in such a way that the control console 700 occupies the space between the wheel-holder unit 200 and the column 101.

The machine M also comprises a locking device 900, for example, a clamp, used to prevent the supporting rod 800 from rotating. More specifically, the locking device 900 is used when the machine M is installed and does not need to be transported. In effect, the locking device 900 prevents the supporting rod 800 from rotating about the second end 800b when the machine M is in use.

The locking device 900 does not, however, prevent the control console 700 from moving around the first end 800a of the control rod 800. More in detail, the control console 700 is applied to the first end 800a of the supporting rod 800 by means of an articulated joint S that is configured to allow the control console 700 to rotate about the articulated joint S even when the supporting rod 800 is locked by the locking device 900. In this situation, the control console 700 is free to rotate so that it can be suitably oriented according to the operator's needs and/or available space.

Also an object of this invention is a method for mounting a tyre P of a vehicle wheel R relative to a corresponding rim C of the wheel R. The method comprises a step of preparing a machine M for mounting and demounting the tyre P relative to the rim C. The machine M includes a frame 100 provided with a column 101 that extends along a vertical direction W and a wheel-holder unit 200 that is movable in rotation about a vertical axis of rotation Y and in translation towards and away from the column 101 along a horizontal axis of translation X. The machine M also comprises a mounting tool 301, configured to operatively engage the tyre P so as to mount the tyre to the rim C. In the preferred embodiment, the machine M comprises a supporting arm 800 connected to the column 101 and configured to support the mounting tool 301. The machine M may comprise a demounting tool 302, configured to operatively engage the tyre P in order to demount the tyre from the rim C.

The machine M also comprises a main arm 400, extending above the wheel-holder unit 200 between a first end 400a that is connected to the column 101, and a second end 400b. The machine M also comprises a working unit 500 that includes a first arm 501a pivoted at a hinge point F to the second end 400b of the main arm 400 to rotate about the hinge point F. The working unit 500 also comprises a first sidewall pressing tool 502a connected to the first arm 501a and configured to come into abutment against a sidewall of the tyre P of the wheel R mounted on the wheel-holder unit 200.

The method also comprises a step of locking the rim C to the wheel-holder unit 200, for example, by means of a clamp.

The method also comprises a step of placing a mounting tool 301 between an annular edge of the rim C and a bead of the tyre P.

According to an aspect of this disclosure, the method comprises a step of moving the main arm 400 in translation (parallel to the horizontal axis of translation X), towards and away from the column 101 in order to bring the hinge point F into vertical alignment with the vertical axis of rotation Y of the wheel-holder unit 200, that is to say, with the centre of the rim C.

As shown in the accompanying drawings, the main arm 400 is movable in translation along a movement axis Z parallel to the horizontal axis of translation X.

According to an aspect of the disclosure, the second arm 501a is tiltable in a vertical plane between a lowered position, where it keeps the first sidewall pressing tool 502a facing the wheel R, and a raised position, where the first sidewall pressing tool 502a is tilted away from the wheel R to prevent it from interfering with operations for locking and removing the rim C to and from the wheel-holder unit 200. After the step of locking the rim C, the method may thus comprise a step of tilting in which the first arm 501a is brought to the lowered position, where it is then possible to operate on the wheel R.

Next, the method comprises a step of moving the working unit 500 along the vertical direction W from a rest configuration, where it is raised and distal from the wheel-holder unit 200 (hence from the wheel R), to a working configuration, where it is moved close to the wheel-holder unit 200 (hence to the wheel R) to bring the first sidewall pressing tool 502a into abutment against the tyre P.

According to an aspect of this disclosure, passing from the rest configuration to the working configuration is accomplished through a step of moving the main arm 400 slidably along the column 101. In this situation, the main arm 400 is made to move vertically in translation along the column 101 in such a way as to move the working unit 500 towards the wheel R to engage the first sidewall pressing tool 502a against the sidewall of the tyre P.

Once the main arm 400 and the mounting tool 301 are in position, the wheel-holder unit 200 is set in rotation.

In this situation, the first sidewall pressing tool 502a, engaged against the tyre P, is entrained in rotation by the tyre P itself and rotates as one therewith while holding down the bead and acting in conjunction with the mounting tool 301 to mount the tyre P.

In a possible embodiment, the method also comprises a step of preparing a second sidewall pressing tool 502b connected to the main arm 400.

More in detail, the second sidewall pressing tool 502b is applied to a second arm 501b that is connected at an angularly fixed position to the second end 400b of the main arm 400 at the hinge point F. In this situation, when the main arm 400 is in the working configuration, the second sidewall pressing tool 502b is engaged against the sidewall of the tyre P and acts in conjunction with the first sidewall pressing tool 502a to seat the upper bead of the tyre P onto the rim C.

This invention achieves the preset aims and overcomes the disadvantages of the prior art.

In effect, this invention provides a machine and a method that are reliable, easy to use and convenient.

More specifically, this invention provides a machine in which the articulated arm, at the start of operations to mount the tyre to the rim, is able to position the hinge point so it is vertically aligned with the wheel-holder unit at whatever position the wheel-holder unit has adopted after being moved in translation along the horizontal axis of translation.

The invention claimed is:

1. A machine for mounting and demounting a tyre relative to a corresponding rim of a vehicle wheel, comprising:
    a frame provided with a column extending along a vertical direction;
    a wheel-holder unit, movable in rotation about a vertical axis of rotation and in translation towards and away from the column along a horizontal axis of translation;
    a supporting arm, connected to the column;
    a mounting tool, connected to the supporting arm and configured to operatively engage the tyre in order to mount the tyre to the rim;

a demounting tool, configured to operatively engage the tyre (P) in order to demount the tyre from the rim;

a main arm, extending above the wheel-holder unit between a first end that is operatively connected to the column, and a second end;

a working unit, connected to the main arm and including:

a first arm pivoted at a hinge point to the second end of the main arm to rotate about the hinge point, where the hinge point lies in a plane that includes the vertical axis of rotation and the horizontal axis of translation, the first arm extending along an extension axis, and a first sidewall pressing tool, connected to the first arm and configured to come into abutment against a sidewall of the tyre of the wheel mounted on the wheel-holder unit, the working unit is movable along the vertical direction between a working configuration, where the working unit is close to the wheel-holder unit and a rest configuration, where the working unit is raised and distal from the wheel-holder unit, wherein the main arm is movable by translation along a movement axis parallel to, and spaced from, the horizontal axis of translation towards and away from the column to keep the hinge point vertically aligned with the vertical axis of rotation of the wheel-holder unit, responsive to a movement in translation of the wheel-holder unit, so that, following a translational movement of the wheel-holder unit, the main arm is made to move in translation parallel to the horizontal axis of translation of the wheel-holder unit, so to keep the vertical axis of rotation of the wheel-holder unit vertically aligned with the hinge point during the translational movement of the wheel-holder unit, and wherein, during the translational movement of the wheel-holder unit, the first arm moves so as to maintain the extension axis along a first plane which intersects a second plane formed by the horizontal axis of translation and the vertical axis of rotation of the wheel-holder unit.

2. The machine according to claim 1, wherein the main arm is movable vertically to move the working unit between the working configuration and the rest configuration.

3. The machine according to claim 1, wherein the first arm is tiltable in a vertical plane between a lowered position, where the first arm keeps the first sidewall pressing tool facing the wheel, and a raised position, where the first sidewall pressing tool is tilted away from the wheel.

4. The machine according to claim 1, wherein the first arm comprises a first portion and a second portion, oriented transversely to the first portion to define a shape like that of a letter L, the first sidewall pressing tool being mounted at a free end of the second portion, and wherein the first portion, when in the working configuration, extends parallel to the vertical direction.

5. The machine according to claim 4, comprising a slider, engaged with the first sidewall pressing tool and movable slidably along the second portion of the first arm to adjust a position of the first sidewall pressing tool.

6. The machine according to claim 1, wherein the working unit comprises a second arm, provided with a second sidewall pressing tool that is connected at an angularly fixed position to the second end of the main arm at the hinge point.

7. The machine according to claim 6, comprising a further slider, engaged with the second sidewall pressing tool and movable slidably along the second arm to adjust a position of the second sidewall pressing tool.

8. The machine according to claim 6, wherein the first and the second sidewall pressing tools are positioned at the same vertical height.

9. The machine according to claim 6, wherein the second sidewall pressing tool is made in the form of a roller that rotates freely about a horizontal axis.

10. The machine according to claim 1, wherein the main arm comprises a first segment, extending from the first end of the main arm, and a second segment, extending from the second end of the main arm and connected to the first segment by a joint configured to allow adjusting an angular position of the second segment relative to the first segment.

11. The machine according to claim 1 comprising:

a control console, configured to receive input data representing a diameter size of the wheel mounted on the wheel-holder unit;

a control unit, configured to receive the input data from the control console and, based on this data, to send instructions to the main arm (400) as to how the main arm must be positioned relative to the wheel-holder unit.

12. The machine according to claim 11, comprising a supporting rod having a first end that is operatively connected to the control console and a second end that is hinged to the frame of the machine (M) to allow the supporting rod to rotate with the control console, the machine further comprising a locking device configured to prevent the supporting rod from rotating.

13. The machine according to claim 12, wherein the control console is applied to the first end of the supporting rod by means of an articulated joint that is configured to allow the control console to rotate about the articulated joint.

14. The machine according to claim 11, wherein the control console comprises:

a display configured to show information relating to a process for mounting or demounting the tyre;

a control desk comprising a plurality buttons and/or levers configured to allow manually controlling the main arm and/or manually controlling the mounting tool;

a supporting structure, extending between the display and the control desk, the supporting structure comprising a vertical central member and a plurality of auxiliary members extending away from the central member in a horizontal direction and provided with tool compartments.

15. A method for mounting a tyre of a vehicle wheel relative to a corresponding rim of the wheel, comprising the following steps:

preparing a machine for mounting the tyre relative to the rim and including:

a frame provided with a column extending along a vertical direction, a wheel-holder unit, movable in rotation about a vertical axis of rotation and in translation towards and away from the column along a horizontal axis of translation, a mounting tool, configured to operatively engage the tyre, a main arm, extending above the wheel-holder unit between a first end that is connected to the column, and a second end, a working unit, including a first arm pivoted to the second end of the main arm at a hinge point to rotate about the hinge point and extending along an extension axis, and a first sidewall pressing tool which is configured to come into abutment against a sidewall of the tyre of the wheel mounted on the wheel-holder unit and which is connected to the first arm, locking the rim to the wheel-holder unit;

moving the wheel-holder unit in translation along the horizontal axis of translation;

moving the working unit along the vertical direction from a rest configuration, where the working unit is raised and distal from the wheel, to a working configuration, where the working unit is moved close to the wheel to bring the first sidewall pressing tool into abutment against the sidewall of the tyre;

placing a mounting tool between an annular edge of the rim and a bead of the tyre;

rotating the wheel-holder unit, moving the main arm in translation along a movement axis, parallel to the horizontal axis of translation and spaced therefrom, towards or away from the column so that the hinge point remains aligned with the vertical axis of rotation of the wheel-holder unit so that, following the translational movement of the wheel-holder unit, the vertical axis is maintained vertically aligned with the hinge point during the translational movement of the wheel-holder unit, and wherein, during the translational movement of the wheel-holder unit, the first arm moves so as to maintain the extension axis along a first plane which intersects a second plane formed by the horizontal axis of translation and the vertical axis of rotation of the wheel-holder unit.

16. The method according to claim 15, comprising a step of tilting the first sidewall pressing tool by rotation about a horizontal axis.

17. The method according to claim 15, comprising a step of preparing a second sidewall pressing tool connected to the main arm, wherein, when the main arm is in the working configuration, the second sidewall pressing tool is in contact with the sidewall of the tyre at a point that is stationary relative to the rotation of the wheel.

18. A machine for mounting and demounting a tyre relative to a corresponding rim of a vehicle wheel, comprising:

a frame provided with a column extending along a vertical direction;

a wheel-holder unit, movable in rotation about a vertical axis of rotation and in translation towards and away from the column along a horizontal axis of translation;

a main arm, extending above the wheel-holder unit between a first end that is operatively connected to the column, and a second end;

a working unit, connected to the main arm and including:

a first arm pivoted at a hinge point to the second end of the main arm to rotate about the hinge point, where the hinge point lies in a plane that includes the vertical axis of rotation and the horizontal axis of translation, the first arm extending along an extension axis, and a first sidewall pressing tool, connected to the first arm and configured to come into abutment against a sidewall of the tyre of the wheel mounted on the wheel-holder unit, the working unit being movable along the vertical direction between a working configuration, where the working unit is close to the wheel-holder unit and a rest configuration, where the working unit is raised and distal from the wheel-holder unit, wherein the main arm is movable by translation along a movement axis parallel to, and spaced from, the horizontal axis of translation towards and away from the column to keep the hinge point vertically aligned with the vertical axis of rotation of the wheel-holder unit, wherein the main arm is further movable vertically to move the working unit between the working configuration and the rest configuration, so that, following a translational movement of the wheel-holder unit, the main arm is made to move in translation parallel to the horizontal axis of translation of the wheel-holder unit, so to maintain the vertical axis of rotation of the wheel-holder unit vertically aligned with the hinge point during the translational movement of the wheel-holder unit, and wherein, during the translational movement of the wheel-holder unit, the first arm moves so as to maintain the extension axis along a first plane which intersects a second plane formed by the horizontal axis of translation and the vertical axis of rotation of the wheel-holder unit.

19. The machine according to claim 18, further comprising:

a supporting arm, connected to the column;

a mounting tool, connected to the supporting arm and configured to operatively engage the tyre to mount the tyre to the rim.

20. The machine according to claim 18, wherein the working unit further comprises a second arm, provided with a second sidewall pressing tool that is connected at an angularly fixed position to the second end of the main arm at the hinge point.

* * * * *